Figures 1, 2:
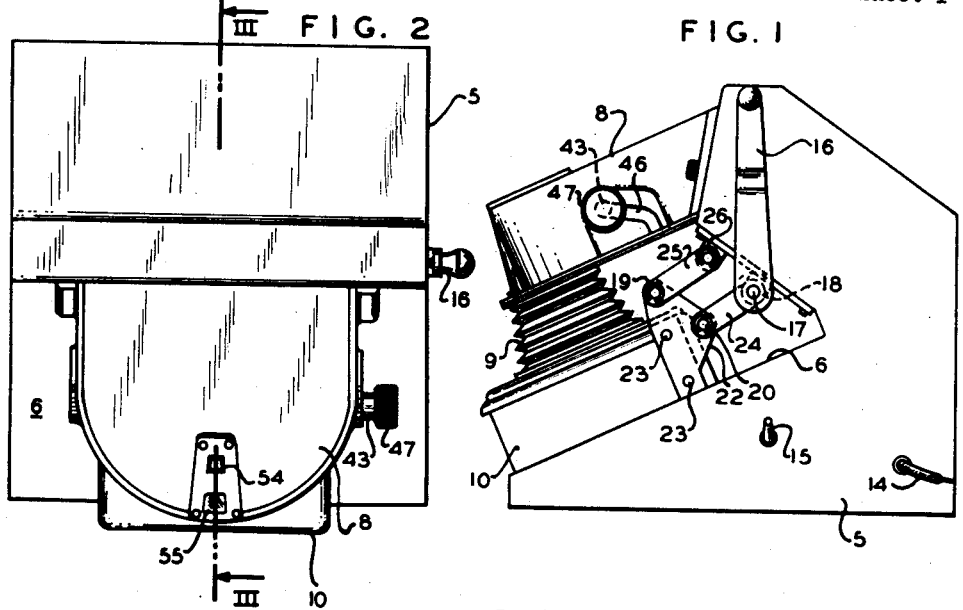

Aug. 23, 1960 — L. L. WEISGLASS ET AL — 2,949,809
COLOR COMPARATOR
Filed April 24, 1958 — 2 Sheets-Sheet 1

INVENTORS
LOUIS L. WEISGLASS
ALFRED SIMMON
BY
ATTORNEY

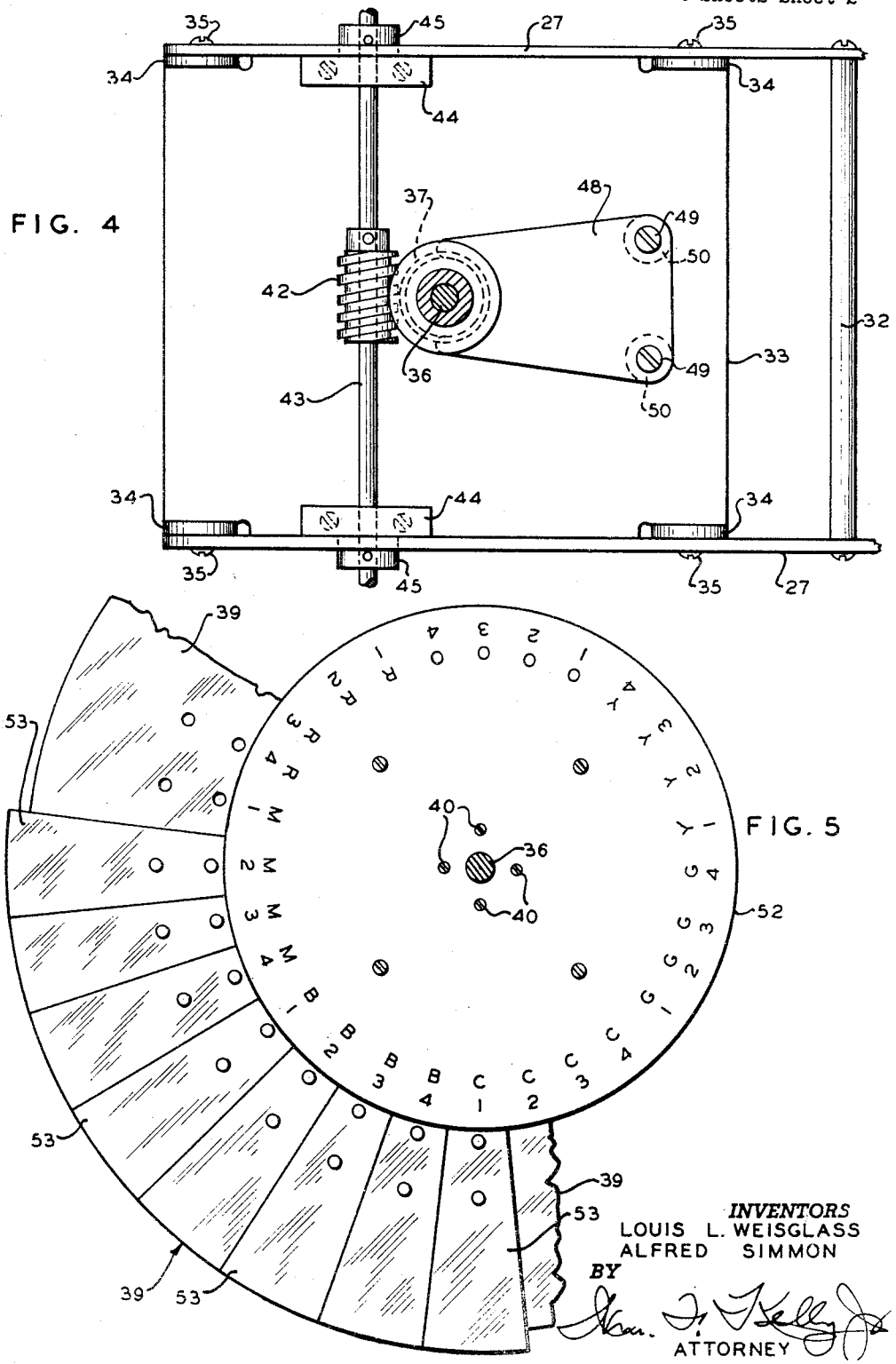

United States Patent Office 2,949,809
Patented Aug. 23, 1960

2,949,809
COLOR COMPARATOR

Louis L. Weisglass, New York, and Alfred Simmon, Garden City, N.Y., assignors to Simmon Brothers, Inc., Long Island City, N.Y., a corporation of New York Filed Apr. 24, 1958, Ser. No. 730,667

4 Claims. (Cl. 88—14)

The present invention relates to a color comparator for determining the proper shade of colors for use in the making of colored photographic prints.

At the present time considerable advances have been made in the production of photographic negative color film, so that when developed the color film contains good color information over a wide range of color densities. The printing paper on which color prints are now being made has been also sufficiently improved, so that a true color rendition throughout can be expected after a good balance has been established at least for one color. Despite this progress in sensitivity of printing paper to various colors, there has heretofore existed the difficulty of producing with fidelity and exactitude, the colors present in the image as recorded on the photographic negative color film.

This has been due to the fact that any printed reproduction possessing any degree of fidelity has been arrived at entirely by empirical determination, or a hit or miss trial technique, without any assurance that the desirable results of color can be achieved with the finished prints thus making the production of colored prints a very expensive procedure. For example, in the making of a print from a negative color film it has heretofore not been uncommon for such print to possess shades of color varying considerably from the natural, as the complexion of the image of an individual being somewhat sallow, or some portion of a scene being a neutral grey rather than grey, or a reddish grey instead of a neutral grey. Under such circumstances it has been extremely difficult to correct for these deficiencies in further printing so that the finished prints will possess more pleasing colors by producing a healthy complexion color on images of individuals and scenery have a more natural color.

It is accordingly the primary object of the present invention to provide a color comparator for determining the precise densities of the most desirable colors for a photographic print and once so determined the photographic printer can be preset to repeatedly reproduce with fidelity and exactitude these same color densities in any number of finished prints.

Another object of the present invention is the provision of a color comparator for the determining of various color shades which is economical in cost and so simple in its operation that no particular skill or training is required for its use.

Figure 3:
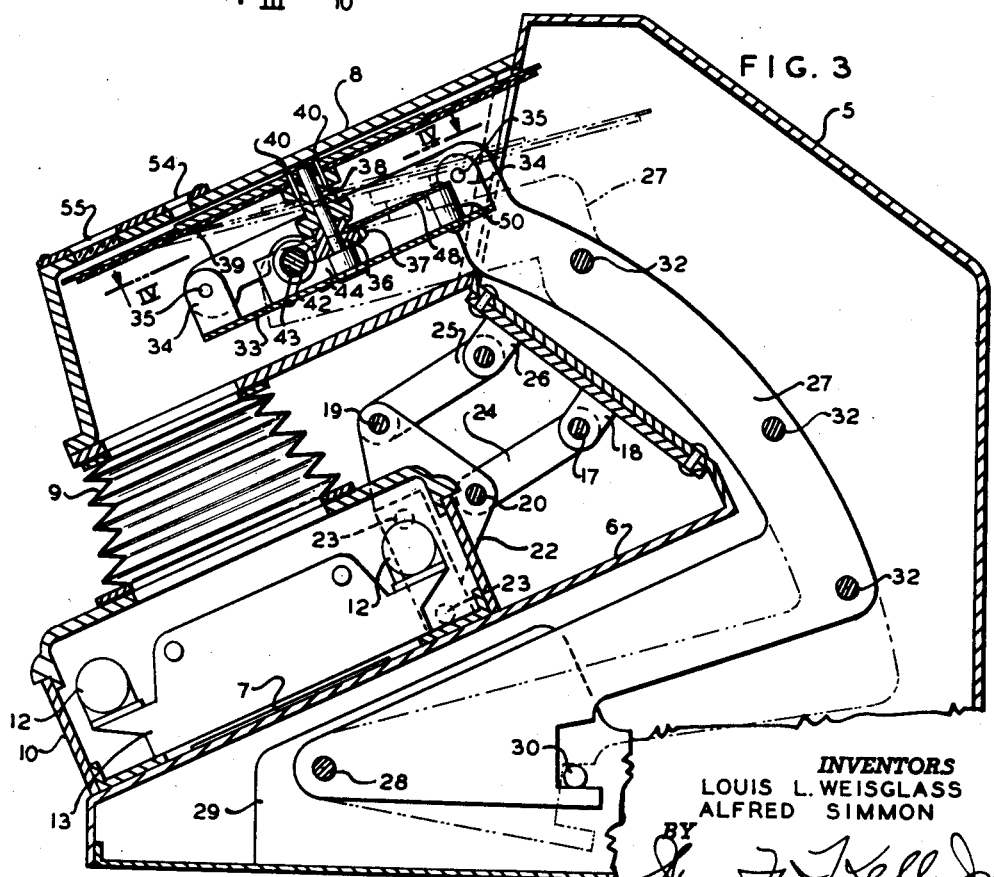

Still further objects of the present invention will become obvious to those skilled in the art by reference to the accompanying drawings wherein:

Figure 1 is a side elevational view of the color comparator of the present invention, Fig. 2 is a top plan view of the color comparator as shown in Fig. 1, Fig. 3 is a cross-sectional view on a slightly enlarged scale and taken on the line III—III of Fig. 2 looking in the direction indicated by the arrows, Fig. 4 is a sectional view taken on the line IV—IV of Fig. 3 and looking in the direction indicated by the arrows, and Fig. 5 is an enlarged fragmentary view of the color disc which forms a part of the color comparator of the present invention.

Referring now to the drawings in detail the color comparator of the present invention as shown therein comprises a housing 5 of a somewhat distorted D-shaped configuration providing an angularly disposed surface 6, on which an "off color" test-print 7 (Fig. 3) to be corrected in finished print, is positioned. The housing 5 is provided with an upper outwardly projecting portion 8 substantially parallel to the angular surface 6 and depending from this projecting portion 8 through a bellows connection 9 is a light-tight hood-shaped member 10 normally enclosing the "off color" test-print 7. By particular reference to Fig. 3 it will be noted that the hood-shaped member 10 is provided with a pair of tubular electric lamps or the like 12 suspended between a pair of supporting brackets 13 and which illuminate the "off color" test-print 7 when these lamps 12 are connected to a source of electrical energy by means of a cable 14 and upon closure of a suitable toggle switch or the like 15 (Fig. 1).

In order to raise the hood-shaped member 10 away from the angular surface 6 by compression of the bellows 9, so as to place the "off color" test-print 7 therebeneath, a lifting lever 16 (Fig. 1) is connected to a shaft 17 extending across the front of the housing 5 immediately in back of the bellows 9, and which lever 16 upon movement rotates this shaft 17 to operate a parallelogram arrangement for lifting of the hood-shaped member 10. As shown, the shaft 17 is journalled in a pair of lugs 18 projecting outwardly from the housing 5 and somewhat similar shafts 19 and 20 interconnect a pair of substantially triangular-shaped brackets 22 to each of which these shafts 19 and 20 are pivotally connected as well as such brackets 22 being rigidly connected at 23 to each side of the hood-shaped member 10. To complete the above-noted parallelogram arrangement a pair of links 24 are pivotally connected to the shaft 20 but rigidly connected to the shaft 17 while a similar pair of links 25 are pivotally connected to the shaft 19 and to projecting lugs 26 on the housing 5.

Accordingly, upon movement of the lever 16 in a clockwise direction as viewed from Fig. 1, or toward the rear of the housing 5 as viewed from Fig. 2, the shaft 17 is slightly rotated causing the links 24 to raise the triangular brackets 22 through the parallelogram arrangement, and thus lift the hood-shaped member 10 from the angular surface 6 by compressing the bellows 9 and allowing an operator to properly position an "off color" test-print 7 on the surface 6, where it will be totally enclosed in a light-tight manner upon return of the hood-shaped member 10 to its normal position when the operator releases the lifting lever 16.

By reference now more particularly to Fig. 3, it will be noted that the housing 5 is interiorly provided with a pair of somewhat distorted Z-shaped brackets 27 which are pivotally connected at their lower ends 28 to an upright bracket 29 with the latter having a pin 30 projecting into a notch provided in the bracket 27 so as to limit movement of such brackets about their pivot 28. To rigidify the assembly these brackets 27 are interconnected by tie-rods or the like 32 (Fig. 4) and at their upper angular disposed ends they carry a support plate 33 secured therebetween by upwardly projecting lugs 34 and screws or the like 35 (Fig. 4). An upstanding stub-shaft 36 is suitably journalled to the support plate 33 which has rigidly secured thereto a pinion gear 37 and a collar 38.

The upper flanged end of this collar 38 has a color comparing disc 39 secured thereto such as by screws or the like 40 (Fig. 5) so that such disc 39 is rotated by the shaft 36 and rigidly affixed pinion gear 37. For the purpose of rotating the latter a worm gear 42 meshes with the pinion gear 37 which is carried by a transversely disposed shaft 43 suitably journalled in pedestal bearings 44 affixed to the support plate 33 with longitudinal movement of such shaft 43 being prevented by collars 45 (Fig. 4). Such shaft 43 at one end protrudes through an angularly disposed slot 46 in the housing 5 (Fig. 1) and is provided with a knurled control knob 47 rotatable by an operator which in turn causes rotation of the disc 39 as previously mentioned. Since the shaft 36 is journalled only at its lower end to the support plate 33, as abovementioned, in order to prevent disengagement between the pinion gear 37 and worm gear 42 a leaf-spring 48 is secured to the support plate 33 by means of bolts or the like 49 which pass through spacing collars 50, with such leaf-spring bearing against the hub of the pinion gear 37, as can be seen from Figs. 3 and 4, thus holding it firmly in mesh with the worm gear 42.

As shown more clearly in Figs. 3 and 5, the disc 39 is formed of a transparent material with a superimposed smaller diameter portion 52, which may or may not be transparent, and having peripheral indicia thereon indicative of four various densities of each of several complementary colors. For example, there are R1 to R4 to indicate four densities of Red, M1 to M4 for Magenta, B1 to B4 for four densities of Blue, C1 to C4 for Cyan, G1 to G4 for Green, Y1 to Y4 for Yellow and O1 to O4 for Orange. Each one of these indicia graduations aligns with a transparent radially aligned peripheral panel 53 secured to the transparent disc 39 of a color density corresponding to that of its adjacent indicia. The housing 5, as can be seen from Figs. 1 and 3, is provided with radially aligned peep-holes or windows 54 and 55 with the slightly larger outermost peep-hole 55 having a relatively weak magnifying lens for slightly enlarging the image of the colored test-print 7 on the surface 6 which it is desired to subsequently print on sensitized paper.

In the operation of the color comparator of the present invention, as herein shown and described, the operator first takes the "off color" test-print 7 which is to be corrected, and after pushing on the lifting lever 16 to raise the hood-shaped member 10, by the parallelogram arrangement to compress the bellows 9, he then places the "off color" test-print 7 on the inclined surface 6 and after releasing the lifting lever 16 he then closes the switch 15 to energize the lamps 12. By gazing into the peep-holes 54 and 55 the operator will observe one of the indicia carried by the smaller diameter portion 52 of the disc 39 through the peephole 54 and one of the color-shaded panels 53, which in the position of the disc 39 as shown in Fig. 5, is "C1" for one shade or density of Cyan. In order to correct a slightly reddish grey, for example, on the "off color" test-print 7, by producing a more neutral grey which may correspond to a "C1" (Cyan 1) density for color correction, the operator pushes rearwardly on the control knob 47 which causes the protruding end of the shaft 43 to slide along the housing slot 46.

Since the shaft 43 is affixed to the support plate 33 carried by the Z-shaped brackets 27, and which is balanced each side of the pivotal connection 28, the pressure by the operator on the control knob 47 causes the brackets 27 to rotate clockwise about such pivots 28 (as viewed from Fig. 3) until the pin 30 engages the upper end of the notch in such brackets 27. By this time the disc 39 carried by the stub-shaft journalled to the support plate 33 will have moved away from under the peephole 55, from its full line position shown in Fig. 3 to the dotted line shown therein along with the brackets 27, which is a sufficient distance to completely remove the color-shaded panel 53, or the panel "C1" shown in Fig. 5, from beneath the peep-hole 55. The operator then observes the illuminated "off color" test-print 7 through the window 55 for the particular shade of "Cyan" appearing in the test-print and then pulls the control knob forward to again interpose the "C1" panel beneath the window for camparison. If "C1" density is not sufficient to correct the slightly reddish grey appearing in the "off color" test-print 7 by making it appear more of a neutral grey the operator then rotates the control knob 47, which will cause rotation of the disc 39 through the pinion 37 and worm 42 drive, to position another density "C2" beneath the peep-hole 55. The operator again moves the control knob 47 back and forth for the purpose of removing and positioning the shaded transparent panel "C2" within view beneath the peep-hole 55 to again compart with the particular density of Cyan present in the "off color" test-print. This is repeated until the operator thus determines which of the four densities "C1" to "C4" most closely represents the natural neutral grey desired and once determined note is made thereof. The operator then proceeds to make an identical comparison with any one of the remaining six colors which he feels needs correction for proper color balance until a determination is noted for the most desirable density of green, yellow, orange, red, magenta or blue, as the case may be.

Once the determination is complete the operator is then ready to commence the actual printing process which is of particular importance in enabling the reproduction of a color print simulating with fidelity the most natural color shades or densities desired in the finished color print. This is of especial value for one utilizing a printing apparatus, such as shown in our copending application, Serial No. 683,526, now Patent No. 2,921,498 issued Jan. 19, 1960, and assigned to the same assignee as the present application, because once the desired density for any of the several desired colors has been determined the abovenoted printing apparatus can be readily preset to the appropriate electrical values and time periods, to produce the selected desired densities on the finished print and corresponding to that as determined by the color comparator, as hereinabove described.

It should thus become obvious to those skilled in the art that a color comparator has been herein provided which can be readily used by anyone without any specific skill or training to quickly and easily determine the particular density of each of several colors most desirable for proper color balance in a finished print, so that the printing apparatus can be preset to reproduce such densities with fidelity and exactitude in such finished print.

Although one specific embodiment of the present invention has been herein shown and described, it is to be understood that still further modifications of the same may be made without departing from the spirit and scope of the invention.

We claim:

1. A color comparator for determining which of the various densities of several colors is most desirable to produce proper color balance in a finished photographic print comprising a housing provided with a light-tight hooded member, a lifting lever exteriorly of said housing and operable to raise and lower said hooded member to permit the insertion of an "off color" test-print to be corrected on a support interiorly of said housing, a source of light for illuminating said test-print when in said housing, a window in said housing to enable an operator to view said "off color" test-print when positioned interiorly of said housing and illuminated by said light source, a member within said housing provided with a plurality of densities of several colors, a control knob on the outside of said housing and operable to move said member to and from a position disposing a given density of one of said several colors beneath said window in the path of the image of said "off color" test-print as observed by an operator to compare such given density with an "off color" density in said test print, means for indicating each particular density of any one of said several colors disposed at any given moment beneath said window, and said control knob being also operable to cause said member to shift another density color beneath said window at the election of an operator.

2. A color comparator for determining which of the various densities of several colors is most desirable to produce proper color balance in a finished photographic print comprising a housing, means for supporting an "off color" test-print to be corrected in said housing, a window in said housing to enable an operator to view said test-print when positioned interiorly of said housing, a color-panel within said housing provided with a plurality of densities of several colors, control means operable to reciprocally move said color-panel to intermittently dispose a given density of one of said colors beneath said window in the path of the image of said "off color" test-print as observed by an operator to compare such given density with an "off color" density in said test-print, means for indicating each particular density of any one of said several colors disposed at any given moment beneath said window, and said control means being also operable to cause shifting of said color-panel to position another density color beneath said window as selected by an operator.

3. A color comparator for determining which of the various densities of several colors is most desirable to produce proper color balance in a finished photographic print comprising a housing provided with a light-tight hooded member, a lifting lever exteriorly of said housing and operable to raise and lower said hooded member to permit the insertion of an "off color" test-print to be corrected on a support interiorly of said housing, a source of light for illuminating said test-print when in said housing, a window in said housing to enable an operator to view said "off color" test-print when positioned interiorly of said housing and illuminated by said light source, a color panel within said housing provided with a plurality of densities of several colors, control means operable to reciprocally move said color-panel to intermittently dispose a given density of one of said several colors beneath said window in the path of the image of said "off color" test-print as observed by an operator to permit comparison of such given density with an "off color" density in said test-print, means for indicating each particular density of any one of said several colors disposed at any given moment beneath said window, and said control means being also operable to cause shifting of said color-panel to position another density color beneath said window at the election of an operator.

4. A color comparator for determining which of the various densities of several colors is most desirable to produce proper color balance in a finished photographic print comprising a housing provided with a light-tight hooded member, a lifting lever exteriorly of said housing and operable to raise and lower said hooded member to permit the insertion of an "off color" test print to be corrected on a support interiorly of said housing, a source of light for illuminating said test-print when in said housing, a window in said housing to enable an operator to view said "off color" test-print when positioned interiorly of said housing and illuminated by said light source, a pair of pivoted brackets within said housing having a support plate carried at their upper ends, a color-disc assembly journalled for rotation on said support plate and provided with peripheral transparent panels of different densities of several colors, a control shaft having a control knob exteriorly of said housing and provided with a gear connected to said color-disc assembly and operable upon the application of transverse pressure to said control knob to cause rotation of said brackets about their pivots and enable an operator to reciprocally move said color-disc assembly to intermittently dispose a transparent panel of a given density of one of said several colors beneath said window in the path of the image of said "off color" test-print as observed by an operator to permit comparison of such given density with an "off color" density in said test-print, means for indicating each particular density of any one of said several colors disposed at any given moment beneath said window, and said control shaft being rotatable by said knob to cause rotation of said color-disc with attendant shifting of a transparent panel of another density color beneath said window as selected by an operator.

References Cited in the file of this patent

UNITED STATES PATENTS

| | | |
|---|---|---|
| 1,984,898 | Schambach et al. | Dec. 18, 1934 |
| 2,440,266 | Hall | Apr. 27, 1948 |
| 2,720,136 | Frank et al. | Oct. 11, 1955 |